3,203,868
METHOD FOR PREPARING TANNABLE
DEPILATED HIDES
Otto Grimm, Darmstadt, Germany, assignor to Röhm & Haas G.m.b.H., Darmstadt, Germany
No Drawing. Filed Oct. 16, 1962, Ser. No. 231,040
Claims priority, application Germany, Apr. 6, 1962, R 32,434
2 Claims. (Cl. 195—6)

The present invention relates to methods for preparing tannable depilated skins and hides.

Heretofore in the preparation of leather, skins and hides have commonly been treated with lime and sulfides, usually with complete or partial destruction of the hair, and subsequently bated in an alkaline medium, most commonly with pancreatic tryptase, alone or together with fungus proteases, in the presence of ammonium salts. Enzymatic dehairing processes in which the hair is kept fully intact are also known. After removal of the hair, however, also in this case a swelling post-treatment with sulfides or lime and sulfides is undertaken, since otherwise no high quality leather, particularly upper leather, is obtained. As a further step, a bating treatment in an alkaline medium has been common.

It has now been found that a high quality leather can be obtained after an enzymatic dehairing without a swelling alkaline post-treatment if the dehairing is carried out with proteolytic enzymes at a pH of 5.5–10.0 with the addition of carbohydrases, preferably those from micro-organisms, and the skins and hides are post-treated after the dehairing with proteolytic enzymes at a pH of 3.0–5.5. For the last-mentioned procedure, proteolytic enzymes from micro-organisms are particularly adaptable. The addition of carbohydrases, preferably those from micro-organisms, has proved particularly advantageous also in this post-treatment.

The enzymatic dehairing can take place in a manner known to those skilled in the art, either in an aqueous dispersion or by the use of powdered enzyme products. In the latter case, the softened hides and skins are suitably treated with the powdered enzyme preparation with agitation, for example in the drum. It is particularly advantageous that fungus enzymes and bacterial enzymes are simultaneously present among the active ingredients in the enzyme preparation. According to the process of the invention, the skins and hides can already be dehaired by machine after 24 hours. After rinsing, the enzymatic post-treatment of the invention takes place in an acid medium, for example in the course of 24–48 hours.

For enzymatic dehairing in an aqueous medium larger amounts of enzymes are required than for the treatment in the drum just mentioned. In this case, a two-step procedure is preferred. For example, in the first stage, bacterial proteases together with carbohydrases formed by micro-organisms are employed. Then the treatment is concluded with fungus proteases, preferably also together with carbohydrases.

For dehairing, proteolytic enzymes from mold fungi, for example Aspergillus types or Streptomyces cultures, and from bacteria are useful. Also, pancreatic tryptase can be employed.

The carbohydrases employed in the treatment are oligases, which, in contrast with polyases, are only able to split oligosaccharides. Carbohydrases are present, for example, in papain, or in almond emulsin, but the process of the invention is advantageously carried out with oligases formed by micro-organisms. The range of the amount of enzyme product is between 3–25% (by weight of the hides and skins after soaking) having a proteolytic activity corresponding to an enzyme value of 5000. Additionally 0.2–2.0% (by weight of the hides and skins after soaking) of carbohydrases corresponding to 500–2000 amylase units per kilogram of enzyme preparation are present. For activation of the enzyme, the usual activators are suitable, such as ammonium salts, for example ammonium sulfate and ammonium chloride, or reducing, oxygen-containing sulfur compounds such as sodium sulfite, or substances like potassium chloride or sodium nitrate.

The subsequent treatment of the dehaired hides in an acid medium is preferably carried out with proteolytic enzymes from micro-organisms, for example mold fungus proteases and bacterial proteases, which, for achieving an optimum effect, can be combined with carbohydrases. The range of the amount of enzyme product is between 0.2–5.0% (by weight of the dehaired hides and skins), said product having a proteolytic activity corresponding to an enzyme value of 5000. If carbohydrases are added up to 5% of carbohydrases corresponding to 2000–5000 amylase units per kilogram of enzyme preparation are to be used. For activation of the enzymes, the compounds mentioned above can similarly be employed.

The acid pH value can be obtained using either inorganic acids or formic acid. However, it has proved particularly advantageous simultaneously or exclusively to use higher carboxylic acids or oxycarboxylic acids such as propionic acid or alphaoxyisobutyric acid.

The new process is particularly adaptable to the preparation of chrome upper leather or combination-tanned leather. In these cases, it is recommended to pickle in the usual fashion subsequent to the acid post-treatment of the dehaired hides. However, vegetable tanned leather as well as leather tanned with synthetic tanning agents can be prepared according to the method of the invention.

A better understanding of the invention and of its many advantages can be had by referring to the following specific examples given by way of illustration.

*Example 1*

Salted cowhides were soaked. After washing and draining, they were agitated for 20 minutes in a drum, without addition of water, with:

3% (by weight of the hides after soaking) of Aspergillus protease from *Aspergillus parasiticus* having a proteolytic activity corresponding to an enzyme value of 5,000 according to A. Küntzel, Gerbereichemisches Taschenbuch, 6th edition, Theodor Steinkopff, Dresden and Leipzig (1955), page 86;

0.6% bacterial protease from *Bacillus subtilis* having a proteolytic activity corresponding to an enzyme value of 5000 and, additionally, a content of carbohydrases corresponding to 1200 amylase units per kilogram of enzyme preparation according to Willstätter, determined according to P. Rona in "Praktikum der physiologischen Chemie," second edition (1931), page 202;

2% Aspergillus protease from *Aspergillus oryzae* with an enzyme value of 12,000 and a β-glucosidase value of 0.026 according to K. Myrbäck, "Enzymatische Katalyse" (1953), page 45;

1% ammonium sulfate;
1% sodium sulfite (calcined);
0.5% sodium thiosulfate (100%);
0.5% phthalimide;
0.5% potassium chloride; and
0.25% sodium phenyl phenolate as a preservative.

After a further five hours, the hides were covered with a layer of water at 20–22° C. After the lapse of a total of 24 hours the hides were dehaired, washed with running water for 15 minutes, and then paddled for one hour with:

300% water at 20° C. (calculated on the weight of the dehaired hides);
3% Aspergillus protease from *Aspergillus parasiticus* having an enzyme value of 1000;
8% sodium chloride;
0.75% ammonium sulfate; and hydrochloric acid to achieve a pH of 5.5 in the hide cross-section.

After a total of 24 hours, the hides were pickled with sodium chloride and hydrochloric acid, then tanned with basic chromium sulfate and, finally, split after tanning. The leather obtained is particularly full and firm-grained.

*Example 2*

Salted cowhides were soaked. After washing and draining they were agitated in a drum for 20 minutes with:

3.5% Aspergillus proteases from *Aspergillus flavus* having a proteolytic activity corresponding to an enzyme value of 5000;
0.7% bacterial protease from *Bacillus subtilis* having a proteolytic activity corresponding to an enzyme value of 5000 and, additionally, a content of carbohydrases corresponding to 1200 amylase units per kilogram of enzyme preparation;
1.2% ammonium sulfate;
1.8% sodium sulfite (calcined);
0.5% potassium chloride; and
0.2% sodium phenyl phenolate as a preservative.

After 5 hours the hides were covered with a layer of water at 20–22° C. After a total of 24 hours the hides were dehaired, washed for 15 minutes with running water, then paddled for one hour with:

300% water at 20° C. (calculated on the weight of the dehaired hides);
1% Aspergillus protease from *Aspergillus parasiticus* having a proteolytic activity corresponding to an enzyme value of 2500;
1% bacterial protease from *Bacillus subtilis* having a proteolytic activity corresponding to an enzyme value of 15,000 and, additionally, a content of carbohydrases corresponding to an amylase value of 3000 per kilogram of enzyme preparation;
8% sodium chloride;
2% ammonium chloride;
0.25% trisodium phosphate; and alpha-oxyisobutyric acid to give a pH of 5.0 in the hide cross-section.

After a total of 24 hours, the hides were treated in the usual fashion, that is, pickled or tanned.

The treatment in an acid medium as described leads to a particularly full leather. The post-treatment as described increases the softness of the leather without influencing the firm-grained of the leather.

*Example 3*

Dried Indian goat skins were soaked. After washing and draining they were agitated in a drum for 20 minutes, without addition of water, with:

3% Aspergillus protease (based on the weight of the hides after soaking) from *Aspergillus parasiticus* having a proteolytic activity corresponding to an enzyme value of 5000;
0.6% bacterial protease from *Bacillus subtilis* having a proteolytic activity corresponding to an enzyme value of 5000 and, additionally, a content of carbohydrases corresponding to 1200 amylase units per kilogram of enzyme preparation;
10% bacterial protease from *Bacillus subtilis* having a proteolytic activity corresponding to an enzyme value of 9000 and, additionally, a content of carbohydrases corresponding to 3000 amylase units per kilogram of enzyme preparation;
1% ammonium sulfate;
1.5% sodium sulfite (calcined);
0.5% phthalimide;
0.5% potassium chloride;
3.5% sodium chloride; and
0.25% sodium phenyl phenolate as a preservative.

After 4 hours, the hides were covered with a layer of water at 20–22° C. After a total of 24 hours the hides were dehaired, washed for 10 minutes with running water, and then paddled for one hour with:

300% water at 30° C. (calculated on the weight of the dehaired hides);
5% Aspergillus protease from *Aspergillus parasiticus* having a proteolytic activity corresponding to an enzyme value of 1250;
5% bacterial protease from *Bacillus subtilis* having a proteolytic activity corresponding to an enzyme value of 1250 and, additionally, a content of carbohydrases corresponding to 600 amylase units per kilogram of enzyme preparation;
3.5% sodium chloride;
2.5% ammonium sulfate; and hydrochloric acid to give a pH of 5.0–5.5

After a total of 24 hours, the hides were pickled or tanned.

*Example 4*

Dried Indian goat skins were soaked. After washing and draining they were agitated in a drum for 20 minutes, without the addition of water, with:

3% (calculated on the weight of the hides after soaking) of Aspergillus protease from *Aspergillus flavus* having a proteolytic activity corresponding to an enzyme value of 5000;
0.6% bacterial protease from *Bacillus subtilis* having a proteolytic activity corresponding to an enzyme value of 5000 and, additionally, a content of carbohydrases corresponding to 300 amylase units per kilogram of enzyme preparation;
4% Aspergillus protease from *Aspergillus oryzae* having a proteolytic activity corresponding to an enzyme value of 12,000 and a content of carbohydrases corresponding to a $\beta$-glucosidase value of 0.026;
1% ammonium sulfate;
2% sodium sulfite (calcined);
0.6% potassium chloride;
0.5% phthalimide; and
0.25% sodium phenyl phenolate as a preservative.

After a further 3 hours, the hides were covered with a 1% solution of soda at 20–22° C. After a total of 24 hours, the hides were dehaired, washed with running water for 10 minutes, and then treated for 1 hour with:

300% water at 30° C. (calculated on the weight of the dehaired hides);
10% Aspergillus protease from *Aspergillus parasiticus* having a proteolytic activity corresponding to an enzyme value of 1250;
10% bacterial protease from *Bacillus subtilis* having a proteolytic activity corresponding to an enzyme value of 1250 and, additionally, a content of carbohydrases corresponding to 600 amylase units per kilogram of enzyme preparation;
2.5% ammonium sulfate;
10% sodium chloride; and formic acid to give a pH of 4.5 to 5.5 in section.

After a total of 24 hours the hides were pickled or tanned. In this manner, a soft leather which also is very firm grained and silky is obtained.

What is claimed is:
1. A method for preparing tannable depilated hides which comprises treating animal hides with a proteolytic enzyme selected from the group consisting of bacterial enzymes and mold enzymes at a pH of from 5.5 to 10 in the presence of a carbohydrase selected from the group consisting of bacterial oligases and mold oligases, removing hair from said hides, and then directly treating the dehaired hides, without alkaline after-liming, with a proteolytic enzyme at a pH of from 3 to 5.5, said enzyme being selected from the group consisting of bacterial enzymes and mold enzymes.

2. A method as in claim 1 wherein said animal hides are soaked and then treated with said proteolytic enzyme and carbohydrase in powdered form by agitation in a drum.

References Cited by the Examiner
UNITED STATES PATENTS 2,857,317   10/58   Grimm _____ 195—6

A. LOUIS MONACELL, *Primary Examiner.*

ABRAHAM H. WINKELSTEIN, *Examiner.*